(12) United States Patent
Smith

(10) Patent No.: US 6,314,889 B1
(45) Date of Patent: Nov. 13, 2001

(54) ADAPTIVE OUTPUT PYROTECHNIC INFLATOR

(75) Inventor: Bradley W. Smith, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/591,908

(22) Filed: Jun. 12, 2000

(51) Int. Cl.[7] ............... C06D 5/00; B60R 21/26
(52) U.S. Cl. .......................... 102/530; 280/736
(58) Field of Search ............. 102/530; 280/736, 280/737

(56) References Cited

U.S. PATENT DOCUMENTS

| | | | |
|---|---|---|---|
| 4,006,919 | 2/1977 | Neuman | 280/736 |
| 4,380,346 | 4/1983 | Davis et al. | 280/736 |
| 5,069,478 | 12/1991 | Kim | 280/733 |
| 5,195,777 | 3/1993 | Cuevas | 280/736 |
| 5,269,561 | 12/1993 | Davis et al. | 280/736 |
| 5,398,966 | 3/1995 | Hock | 280/736 |
| 5,433,476 | 7/1995 | Materna et al. | 280/736 |
| 5,551,724 | 9/1996 | Armstrong, III et al. | 280/737 |
| 5,551,725 * | 9/1996 | Ludwig | 280/737 |
| 5,609,359 | 3/1997 | Johnson et al. | 280/736 |
| 5,788,274 | 8/1998 | Gunn | 280/736 |
| 5,951,040 | 9/1999 | McFarland et al. | 280/736 |
| 5,992,881 | 11/1999 | Faigle | 280/737 |
| 6,007,097 * | 12/1999 | Rink et al. | 280/737 |
| 6,029,995 * | 2/2000 | Fink | 280/737 |
| 6,074,502 * | 6/2000 | Burns et al. | 149/36 |
| 6,103,030 | 8/2000 | Taylor et al. | 149/46 |
| 6,120,058 * | 9/2000 | Mangum et al. | 280/741 |
| 6,131,948 * | 10/2000 | Cuevas | 280/737 |
| 6,176,518 * | 1/2001 | Faigle | 280/736 |
| 6,196,582 * | 3/2001 | Sparkman et al. | 280/736 |
| 6,237,950 * | 5/2001 | Cook et al. | 280/736 |

FOREIGN PATENT DOCUMENTS

| | | | |
|---|---|---|---|
| 2 046 515 | 9/1978 | (DE) | B60R/21/10 |
| 2291495 | 1/1996 | (GB) | B60R/21/16 |
| 2298912 | 9/1996 | (GB) | B60R/21/26 |
| 08 332 912 | 12/1996 | (JP) | B60R/21/26 |
| 97/34785 | 9/1997 | (WO) | B60R/21/26 |

* cited by examiner

Primary Examiner—Charles T. Jordan
Assistant Examiner—Kimberly S. Smith
(74) Attorney, Agent, or Firm—Sally J. Brown; James D. Erickson

(57) ABSTRACT

An inflator device and control assembly combination is provided wherein the inflator device includes a first chamber wherein a supply of a combustible gas generant material having a burn rate which is pressure dependent is burned to produce gas. The inflator device also includes an exit of adjustable cross sectional area in fluid communication with the first chamber and wherethrough at least a portion of the product gas can exit the inflator device. The control assembly is in operational control communication with the inflator device and provides a control signal to the inflator device to effect adjustment of the cross sectional area of the exit dependent on at least one chosen product gas output performance factor. Also provided are associated or related methods for adjusting inflation gas output from an inflator device.

29 Claims, 12 Drawing Sheets

ADAPTIVE OUTPUT PYROTECHNIC INFLATOR

BACKGROUND OF THE INVENTION

This invention relates generally to inflators such as for use in inflating inflatable restraint airbag cushions to provide impact protection to occupants of motor vehicles. More particularly, the invention relates to inflators which rely primarily on reaction of a combustible material for the production of an inflation gas and such as may provide an inflation gas output which is adaptive to factors such as one or more crash and occupant conditions.

It is well known to protect a vehicle occupant using a cushion or bag, e.g., an "airbag," that is inflated or expanded with gas when the vehicle encounters sudden deceleration, such as in a collision. In such systems, the airbag cushion is normally housed in an uninflated and folded condition to minimize space requirements. Upon actuation of the system, the cushion begins being inflated in a matter of no more than a few milliseconds with gas produced or supplied by a device commonly referred to as an "inflator."

Various types of inflator devices have been disclosed in the art for the inflation of an airbag such as used in inflatable restraint systems. One type of known inflator device derives inflation gas from a combustible pyrotechnic gas generating material which, upon ignition, generates a quantity of gas sufficient to inflate the airbag.

In general, the burn rate for a gas generant composition can be represented by the equation (1), below:

$$r_b = k(P)^n \quad (1)$$

where, $r_b$ = burn rate (linear)
$k$ = constant
$P$ = pressure
$n$ = pressure exponent, where the pressure exponent is the slope of a linear regression line drawn through a log-log plot of burn rate versus pressure.

As will be appreciated, the pressure exponent generally corresponds to the performance sensitivity of a respective gas generant material, with lower burn rate pressure exponents corresponding to gas generant materials which desirably exhibit corresponding lesser or reduced pressure sensitivity.

Typical pyrotechnic-based inflator devices commonly include or incorporate certain component parts including, for example: a pressure vessel wherein the pyrotechnic gas generating material is burned; various filter or inflation medium treatment devices to properly condition the inflation medium prior to passage into the associated airbag cushion and a diffuser to assist in the proper directing of the inflation medium into the associated airbag cushion.

To date, sodium azide has been a commonly accepted and used gas generating material. While the use of sodium azide and certain other azide-based gas generant materials meets current industry specifications, guidelines and standards, such use may involve or raise potential concerns such as involving handling, supply and disposal of such materials. Further, economic and design considerations have also resulted in a need and desire for alternatives to azide-based pyrotechnics and related gas generants. For example, interest in minimizing or at least reducing overall space requirements for inflatable restraint systems and particularly such requirements related to the inflator component of such systems has stimulated a quest for gas generant materials which provide relatively higher gas yields per unit volume as compared to typical or usual azide-based gas generants. Still further, automotive and airbag industry competition has generally lead to a desire for gas generant compositions which satisfy one or more conditions such as being composed of or utilizing less costly ingredients or materials and being amenable to processing via more efficient or less costly gas generant processing techniques.

As a result, the development and use of other suitable gas generant materials has been pursued. Through such efforts, various azide-free pyrotechnics have been developed for use in such inflator device applications including at least some which have or exhibit a relatively high burn rate pressure dependency, e.g., have a burn rate pressure exponent of 0.4 or more.

In view of possibly varying operating conditions and, in turn, possibly varying desired performance characteristics, there is a need and a desire to provide what has been termed an "adaptive" inflator device and a corresponding inflatable restraint system. With an adaptive inflator device, output parameters such as one or more of the quantity, supply, and rate of supply (e.g., mass flow rate) of inflation gas, for example, can be selectively and appropriately varied dependent on selected operating conditions such as ambient temperature, occupant presence, seat belt usage and rate of deceleration of the motor vehicle, for example.

While such adaptive systems are desirable, they typically require the inclusion of additional components as a part of the associated inflator device and such as may undesirably increase one or more of the size, cost and weight of the inflator device. For example, various proposed or currently available dual stage inflator devices appear based on the principal of packaging together two separate inflators. As a result, such inflator combinations commonly include two distinct pressure vessels, two sets of filter or inflation gas treatment components, one for the output of each of the pressure vessels, and two distinct diffusers, again one for the output of each of the pressure vessels. Thus, it has been difficult to provide an adaptive inflator which will satisfactorily meet the size, cost and weight limitations associated with modern vehicle design, particularly as it pertains to driver side applications.

Perhaps the simplest form of an adaptive inflation system is an inflation system which utilizes an inflator which provides two levels or stages of performance, e.g., commonly called or referred to as a "two-stage or dual stage" inflator. Those skilled in the art, however, appreciate that even a relatively simple two-stage inflator may require significantly sophisticated actuation and/or control systems, as compared to typical single stage inflators, in order to realize particularly desired adaptive performance capabilities.

In view of the above, there is a need and a demand for a combustible material-based adaptive performance inflator device of desirably simple design and construction. In particular, there is a need and a demand for such an adaptive performance inflator device which more freely permits the use of azide-free pyrotechnics, such as those which have or exhibit a relatively high burn rate pressure dependency, e.g., a burn rate pressure exponent of 0.4 or more. Further, there is a need and a demand for adaptive performance inflatable restraint assembly combinations which are conducive for use in conjunction with relatively simple control arrangements.

Still further, while current trends and developments have focused to a large extent on the development and incorporation of various adaptive performance restraint installations, a large proportion and number of earlier inflatable restraint installations made use of traditional inflatable restraint assemblies. Thus, there is a need and a demand for an adaptive performance inflatable restraint assembly combination such as may, if desired, be used in a retrofit fashion within various existing inflatable restraint installations.

SUMMARY OF THE INVENTION

A general object of the invention is to provide an improved inflator and associated or corresponding methods of inflation gas supply.

A more specific objective of the invention is to overcome one or more of the problems described above.

The general object of the invention can be attained, at least in part, through a combination which includes an inflator device and a control assembly in operational control communication with the inflator device. In accordance with one preferred embodiment of the invention, the inflator device includes a first chamber wherein a supply of a combustible gas generant material having a burn rate which is pressure dependent is burned to produce gas. The inflator device also includes an exit of adjustable cross sectional area in fluid communication with the first chamber and wherethrough at least a portion of the product gas can exit the inflator device. The control assembly desirably provides a control signal to the inflator device to effect adjustment of the cross sectional area of the exit dependent on at least one chosen product gas output performance factor.

In accordance with a preferred practice of the invention, variability in inflator output is achieved through change in combustion pressure such as resulting from the change in cross sectional area of the exit. Since the burn rate of the gas generant material, e.g., pyrotechnic, is dependent on pressure, changes in combustion pressure correspondingly change the generant burn rate, thus varying the inflator output, e.g., mass flow rate. For example, reducing the inflator exit area raises the combustion pressure which, in turn, raises the generant burn rate which increases the mass flow rate from the inflator. Correspondingly, increasing the inflator exit area reduces the combustion pressure which, in turn, reduces the generant burn rate which decreases the mass flow rate from the inflator. Such performance behavior is opposite to that of prior art inflators such as certain stored gas inflators which incorporate an adjustable exit area. In particular, such prior art inflators typically experience a reduction in mass flow rate from the inflator with a reduction in exit area and an increase in mass flow rate from the inflator with an increase in exit.

The prior art generally fails to provide adaptive performance inflator devices of desirably simple design and construction. In particular, the prior art fails to provide such an adaptive performance inflator device which relies largely or primarily on the reaction of a combustible material, e.g., a pyrotechnic, especially such as various azide-free pyrotechnics which have or exhibit a relatively high burn rate pressure dependency, to form or produce inflation gas. Further, the prior art generally fails to provide adaptive performance inflatable restraint assembly combinations which are conducive for use in conjunction with relatively simple control arrangements and such as may, if desired, be used in a retrofit fashion within existing inflatable restraint installations.

In accordance with another preferred embodiment, the invention comprehends such as a combination wherein the inflator device includes a plurality of first ports in fluid communication with the first chamber and wherethrough at least a portion of the product gas can exit the inflator device. The inflator device also includes a plurality of second exit ports also in fluid communication with the first chamber with a cover element movable to selectively cover the second exit ports and prevent product gas to exit the inflator device through the second exit ports. The control assembly provides a control signal to the inflator device dependent on at least one chosen product gas output performance factor to effect movement of the cover element to selectively cover the second exit ports.

The invention still further comprehends a method for adjusting inflation gas output from a device which includes a first chamber wherein a supply of a combustible gas generant material is burned to produce gas. The device also includes an exit in fluid communication with the first chamber and wherethrough at least a portion of the produced gas can exit the device. In accordance with one preferred embodiment of the invention, such a method involves adjusting the cross sectional area of the exit in response to receipt of a control signal from an associated control assembly, the control signal being dependent on at least one chosen product gas output performance factor for the device.

As used herein, references to the detection or sensing of "occupant presence" are to be understood to refer to and include detection and/or sensing of size, weight, and/or position of an occupant under consideration.

References to inflator or inflation gas "output" are to be understood to refer to inflator performance output parameters such as the quantity, supply, and rate of supply of inflation gas. With "adaptive output inflators," the inflator output is generally dependent on selected operating conditions such as ambient temperature, occupant presence, seat belt usage and rate of deceleration of the motor vehicle, for example.

Further, references herein to a combustible gas generant material, e.g., a pyrotechnic, having a burn rate which is "pressure dependent" are to be understood to refer to those combustible gas generant materials having a relatively high burn rate pressure dependency. In the context of the invention, such a relatively high burn rate pressure dependency is generally signified by a burn rate pressure exponent of at least about 0.4, preferably by a burn rate pressure exponent of at least about 0.5 and, more preferably, by a burn rate pressure exponent in the range of at least about 0.55 to about 0.60.

Other objects and advantages will be apparent to those skilled in the art from the following detailed description taken in conjunction with the appended claims and drawings.

DETAILED DESCRIPTION OF THE INVENTION

The present invention, as is described in more detail below, provides an improved inflation fluid-providing combination such as may be used in association with an inflatable vehicle occupant restraint as well as an improved method for adjusting inflation gas output from a corresponding inflator device.

Figure 1:
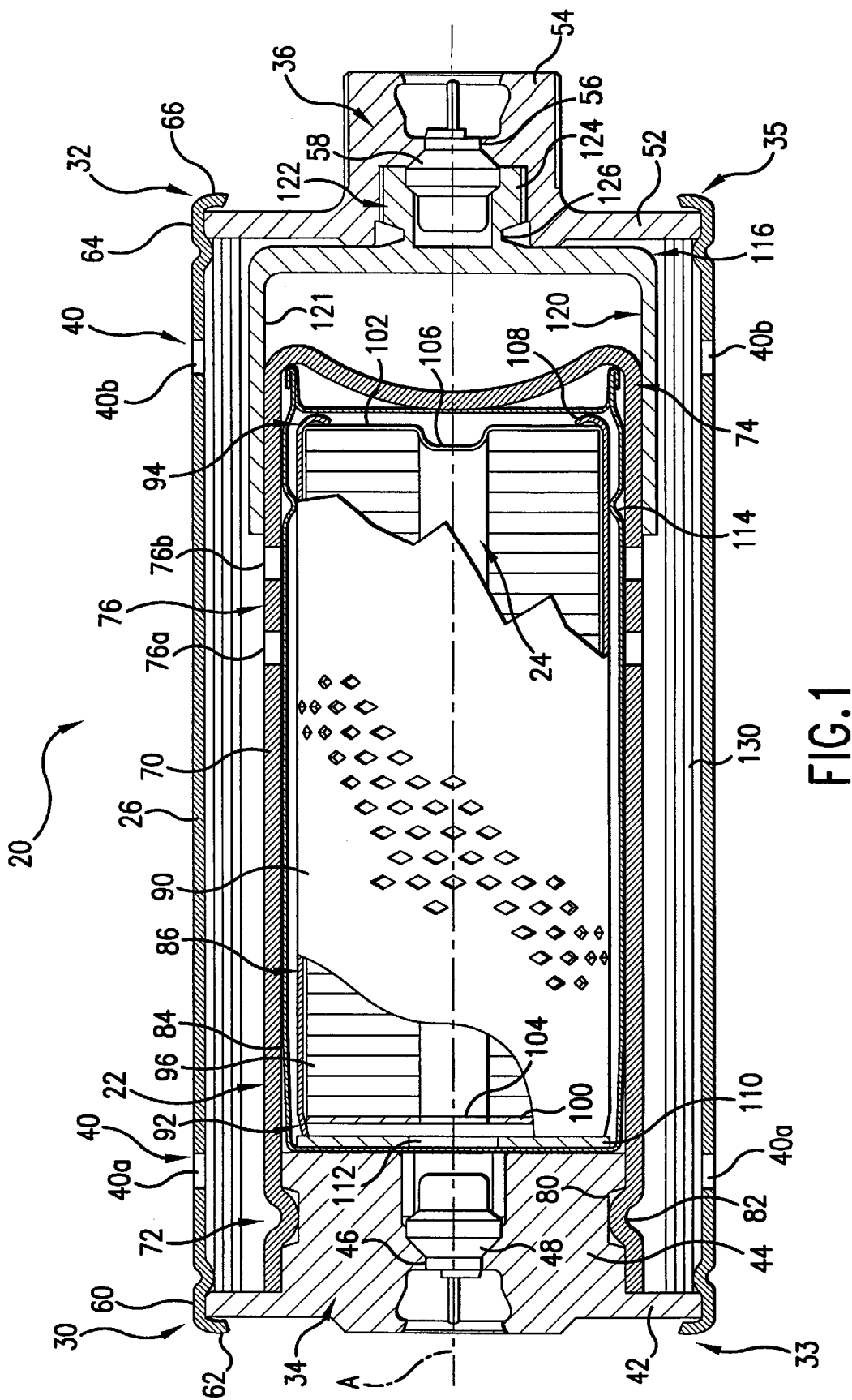
FIG. 1 is a partially in section, schematic drawing of an inflator in accordance with one preferred embodiment of the invention.

As will be appreciated, the present invention may be embodied in a variety of different structures. Referring initially to FIG. 1, there is illustrated the present invention as embodied in the form of an inflator device, generally designated by the reference numeral 20 and such as may be utilized in the inflation of an associated inflatable device (not shown), such as having the form and function of a vehicle occupant restraint, for example.

The inflator device 20 forms or otherwise includes a diffusion chamber 22 and a combustion chamber 24. The diffusion chamber 22 and the combustion chamber 24 are each generally concentrically centered along an axis, designated by the reference character A, and elongated relative thereto, with the diffusion chamber 22 generally radially surrounding the combustion chamber 24.

The diffusion chamber 22 is at least partially defined by an elongated generally cylindrical sleeve outer housing 26 having oppositely situated open first and second ends 30 and 32, respectively. The inflator device 20 includes a first end portion 33 whereat the outer housing first end 30 is closed by a first base member 34. Similarly, the inflator device 20 includes a second end portion 35 whereat the outer housing second end 32 is closed by a second base member 36.

The outer housing 26 includes a plurality of exit openings, generally designated by the reference numeral 40, wherethrough inflation fluid, e.g., inflation gas, formed, produced or otherwise supplied by the inflator device 20 can be properly discharged into communication with an associated inflatable device (not shown). For example, and as shown, such exit openings 40 may be in the form or constitute a first set of exit openings 40a disposed about the outer housing first end 30 and a second set of exit openings 40b disposed about the outer housing second end 32.

The first end base 34 forms or includes a generally annular disc or planar portion 42. The first end base 34 also forms or includes a shoulder portion 44 which, in the illustrated embodiment is shown as projecting inward with respect to the combustion chamber 24. The first end base 34 also forms or includes a central opening 46 in which is received a first initiator device 48.

The second end base 36 also forms or includes a generally annular disc or planar portion 52, a shoulder portion 54 and a central opening 56 in which is received a second initiator device 58. For reasons which will become more apparent with the operational description below, the second end base shoulder portion 54 desirably and as shown projects outward with respect to the diffusion chamber 22.

The end bases 34 and 36 can be joined with or attached to the outer housing 26 in any of a variety of manners, as may be desired or suited for particular installations. For example and as shown, the first end base 34 may be secured to or with the outer housing first end 30 by means of a radial crimp 60 and a radial forming end 62 formed in the outer housing first end 30. Similarly, the second end base 36 may be secured to or with the outer housing second end 32 by means of a radial crimp 64 and a radial forming end 66 formed in the outer housing second end 32.

The combustion chamber 24 is at least partially defined by an elongated generally cylindrical inner housing 70 having an open first end 72 and an oppositely situated closed second end 74. The inner housing 70 includes a plurality of exit ports, generally designated by the reference numeral 76, wherethrough inflation fluid, e.g., inflation gas, formed, produced or otherwise provided by the combustion chamber 24 can be properly discharged from the combustion chamber 24, such as into the diffusion chamber 22. For example, and as shown, such exit ports 76 may be in the form or constitute first and second sets of exit ports, 76a and 76b, respectively.

The inner housing first end 72 is closed by the first base member 34. In particular, as shown in FIG. 1, the inward projecting shoulder portion 44 of the first base member 34 includes a radial groove 80 whereat the inner housing first end 72 is secured such as by means of a radial crimp 82.

The combustion chamber 24 houses or contains a gas generant cartridge 84, such as formed of a relatively thin and light weight, nonreactive metal, such as brass, for example. The gas generant cartridge 84 contains a gas generant housing assembly 86 which includes an elongated, generally cylindrical basket element 90 having first and second ends, 92 and 94, respectively. For example, such a basket 90 may typically be made or formed of an expanded or perforated metal such as described in commonly assigned Armstrong, III et al, U.S. Pat. No. 5,551,724, issued Sept. 03, 1996, whose disclosure is fully incorporated herein by reference.

The basket 90 is shown as containing or including a selected gas generant material such as in the form of a plurality of axially aligned wafers 96. While the invention may, if desired, be practiced employing various gas generant materials, as are known in the art, the invention has particular perceived utility when used in conjunction with those gas generant materials, e.g., pyrotechnics, which have or exhibit a relatively high burn rate pressure dependency, e.g., have a burn rate pressure exponent of 0.4 or more. As identified above, such gas generant materials include various newly developed azide-free pyrotechnics. The metal ammine nitrate-containing azide-free gas generant compositions disclosed in U.S. patent application Ser. No. 09/221, 910, filed Dec. 28, 1998, now U.S. Pat. No. 6,103,030, issued Aug. 15, 2000, and whose disclosure is fully incorporated herein, are an example of one preferred form of an azide-free gas generant composition having such a high burn rate pressure dependency for use in the practice of the invention. As disclosed in that application, one particularly preferred gas generant composition in accordance therewith includes: between about 35 and about 50 wt % of guanidine nitrate fuel, between about 30 and about 55 wt % copper diammine dinitrate oxidizer, between about 2 and about 10 wt % silicon dioxide burn rate enhancing and slag formation additive, and between about 0 and about 25 wt % ammonium nitrate supplemental oxidizer. As the burn rate of such pyrotechnic gas generant materials is a strong function of pressure, higher combustion pressures can produce or result in higher mass flow rates of produced or formed gases. Correspondingly, with such pyrotechnic gas generant materials, lower combustion pressures can produce or result in lower mass flow rates of produced or formed gases.

The gas generant wafers 96 are secured within the basket 90 between a first end inner washer 100 and a second end plate 102 such as may serve to close the basket ends 92 and 94, respectively. The first end inner washer 100 includes a central opening 104 such as to permit passage therethrough of an initiation discharge from the first initiator 48 and into communication with the gas generant wafers 96 contained within the cartridge 84. The second end plate 102 include a centered dimple protrusion 106 such as may more readily permit desired placement and alignment of the gas generant wafers 96. Further, the use of an end closure which blocks or otherwise obstructs continuous passage along the central axis of the gas generant wafer stack can serve to facilitate possibly desired treatment of such stacked or aligned gas generant wafers, such as by facilitating the coating of the wafers along such axis.

Such first end washer 100 and second end plate 102 can be variously joined or secured with or to the basket 90. For example, the basket first end 92 is shown as crimped or swagged adjacent the first end washer 100. The basket second end 94 is shown as having a radial forming crimp 108 adjacent the second end plate 102.

The gas generant cartridge 84 may, as shown, further include an outer washer 110 or other desired support element situated therewithin adjacent the gas generant housing assembly 86. The outer washer 110 includes a central opening 112 such as to permit passage therethrough of an initiation discharge from the first initiator 48. As will be described in greater detail below, the outer washer 110 serves to provide structural support to the generant cartridge 84 on actuation and firing of the first initiator device 48.

The gas generant cartridge 84 may, if desired and as shown, also include a radial groove 114 such as may serve to facilitate centering of the gas generant housing assembly 86 and, particularly, the gas generant housing basket 90, therewithin. As will be appreciated, such centering may be desired to better ensure that the gas generant housing assembly 86 does not block, obstruct or otherwise undesirably restrict combustion product flow or passage from the housing assembly 86 and out through the exit ports 76.

The inflator device 20 further includes a cover or piston component 116 such as situated adjacent the second end base 36. The cover component 116 includes a cover element 120 having the general shape of a cup with a cylindrical sidewall 121 situated adjacent the inner housing second end 74. The cover component 116 also includes a sleeve 122 projecting oppositely of the cup-shaped cover element 120. The sleeve 122 includes a base portion 124 situated adjacent the second initiator device 58 and a portion or region of reduced thickness, generally designated by the reference numeral 126, the use of which will be described in greater detail below.

Also, if desired and as shown, the diffusion chamber 22 may house or contain a gas treatment element 130, such as spaced away and radially surrounding the combustion chamber 24. For example, a gas treatment element 130 such as formed of several wraps of an expanded metal, such as described above, can be desirably included to serve as a heat sink effective to reduce the temperature of the inflation fluid passing therethrough, prior to the discharge of such inflation fluid from the inflator device 20. Alternatively or in addition, particular gas treatment elements may be included or serve to filter or otherwise remove particulates from the inflation fluid passing therethrough.

Figure 2:
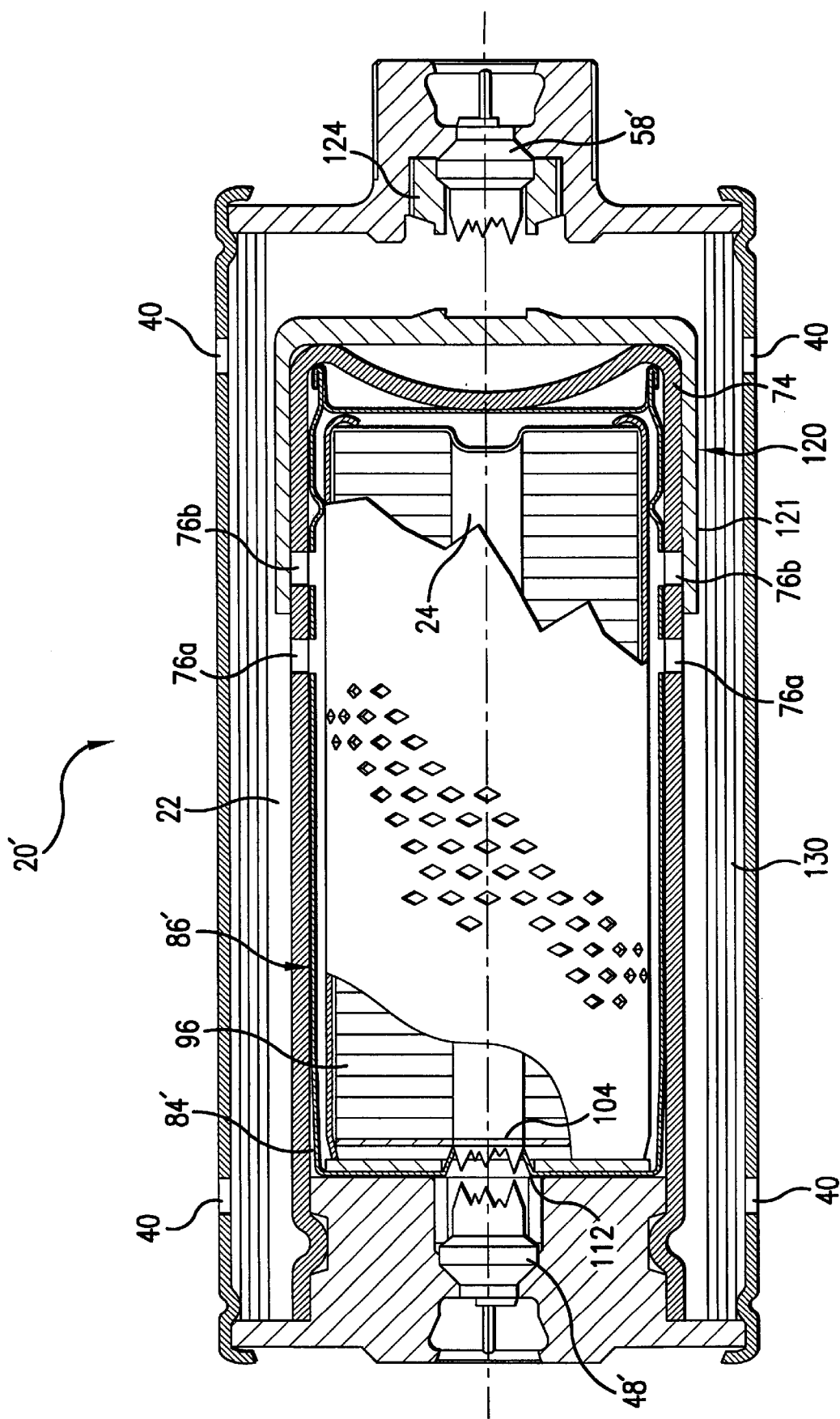
FIG. 2 is a partially in section, schematic drawing of the inflator shown in FIG. 1 but now showing the cover element selectively covering at least certain exit ports of the inflator.

The inflator device 20 is shown in FIG. 1 with the cover component 116 in a static state whereby the exit area composed of the first and second exit ports 76a and 76b is open to permit the passage of the inflation fluid therethrough upon actuation. FIG. 2 illustrates the inflator device, now designated 20', after actuation of the first and second initiator devices 48' and 58', respectively.

As shown, actuation of the first initiator device 48' results in the rupture or otherwise opening of the gas generant cartridge 84'. In particular, the gas generant cartridge adjacent the first outer washer opening 112 is ruptured permitting passage of an initiating discharge therethrough. The initiating discharge is then passed through the inner washer opening 104 into contact with the gas generant material 96 contained within the housing assembly 86' to effect ignition of the gas generant material. Such ignition will result in combustion of at least a portion of the gas generant material and an increase in pressure within the gas generant cartridge 84'. When the pressure within the gas generant cartridge 84' is sufficiently increased, those portions of the gas generant cartridge adjacent the exit ports 76a and 76b will rupture or otherwise open to permit passage therethrough of the combustion products. With such passage, the combustion products are passed into the diffusion chamber 22, into contact with the gas treatment element 130 therein contained, and subsequently out of the inflator device 20 through one or more of the outer housing exit openings 40. As will be appreciated, such passage of combustion products into the diffusion chamber 22 will consequently result in at least a temporary increase in pressure within the diffusion chamber 22.

Actuation of the second initiator device 58' directs a discharge at or otherwise produces or results in the separation or release of the cover component cup-shaped cover element 120 from the cover component sleeve base portion 124. With such separation or release, the above-described increase in pressure within the diffusion chamber 22 associated with the passage of combustion products into the diffusion chamber acts on the cover element 120 to drive or otherwise move the cover element adjacent the combustion housing second end 74, as shown, such that the cover sidewall 121 covers, blocks or otherwise obstructs passage through at least the exit ports 76b.

As a result, the cross sectional area of the exit from the chamber 24, can be adjusted to result or produce in a higher or greater pressure within the chamber. Thus, when the invention is practiced employing gas generant materials, e.g., pyrotechnics, which have or exhibit a relatively high burn rate pressure dependency, e.g., have a burn rate pressure exponent of 0.4 or more, such as identified above, such higher combustion pressures can produce or result in higher mass flow rates of produced or formed gases. Consequently, such an arrangement is sometimes referred to herein as a "high rise rate"("high mass flow rate") performance arrangement.

As will be appreciated by those skilled in the art and guided by the teachings herein provided, the adjustment of the exit area, such as in response to one or more crash and occupant conditions, can be selected dependent on at least one chosen product gas output performance factor, including, inflation gas mass flow rate and temperature, for example.

Figure 3:
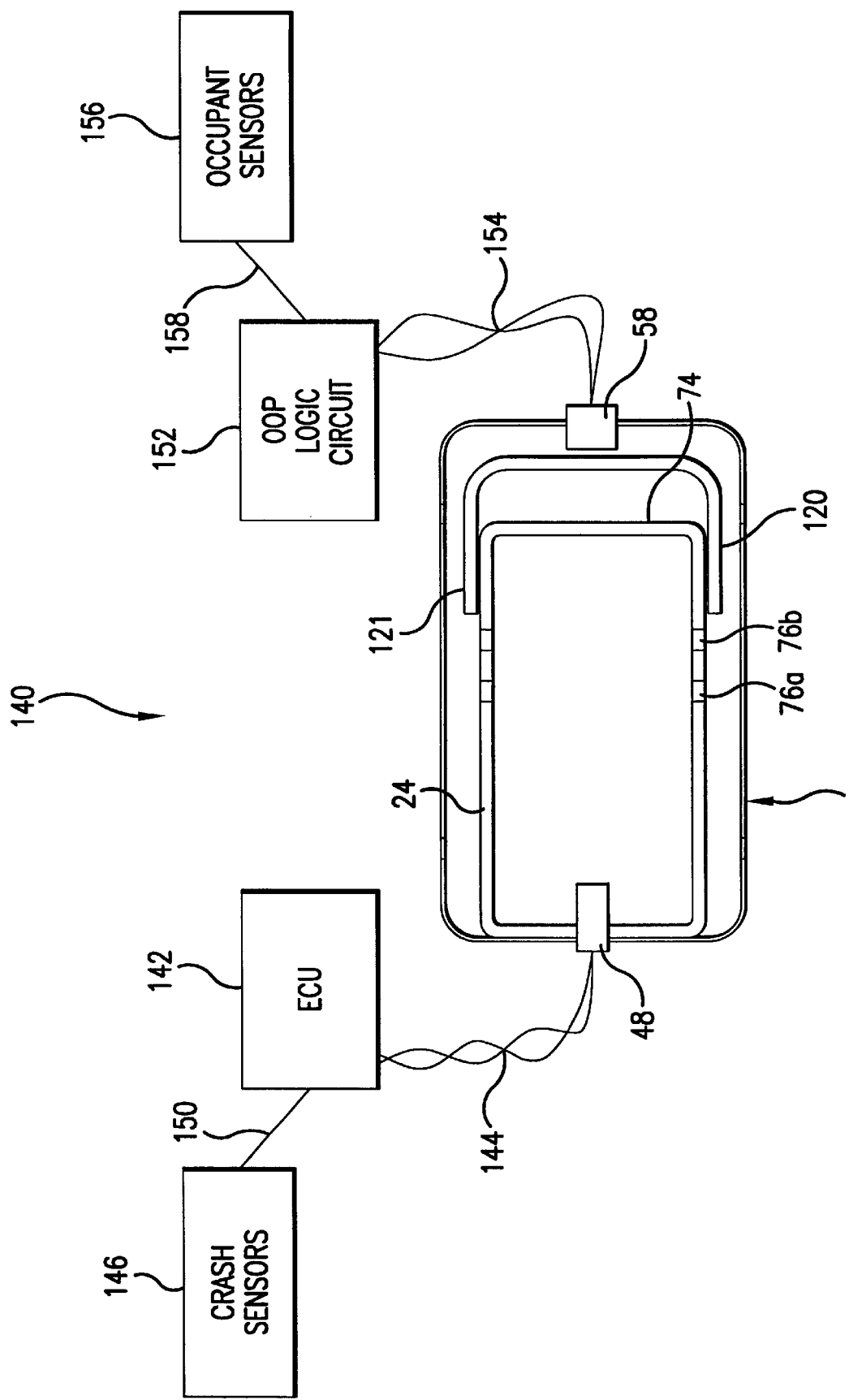
FIG. 3 is a simplified schematic illustrating an inflatable restraint system assembly in accordance with one preferred embodiment of the invention.

Various control arrangements can be employed in the practice of the invention. FIG. 3 is a simplified schematic illustrating an inflatable restraint system assembly 140 in accordance with one preferred embodiment of the invention and which incorporates the inflator device 20. In addition to the inflator device 20, the inflatable restraint system assembly 140 also includes an electronic control unit (ECU) 142 in control communication with the inflator device via electrical wiring 144 to the first initiator 48.

The inflatable restraint system assembly 140 further includes one or more crash sensors 146. Crash sensors, such as know in the art, are available and which are capable of sensing or detecting one or more selected parameters relating to the occurrence of a crash. For example, it is known to use a sudden or rapid vehicular deceleration as a crash occurrence parameter. As schematically shown in FIG. 3, the crash sensors 146 and the ECU 142 are in signal communication, as signified by the line 150.

As will be appreciated, in such an inflatable restraint system assembly, the ECU 142 can serve to signal and control if and when the first initiator device 48 is actuated and consequently if and when the inflator device 20 is actuated to produce and discharge a desired inflation fluid. For example, upon receipt of a proper or appropriate signal from the crash sensors 146, the ECU 142 will signal or otherwise actuate the first initiator device 48 such as to effect reaction of the gas generant material contained within the inflator device 20 and the generation of gas thereby.

The inflatable restraint system assembly 140 also includes a logic circuit, herein designated an out-of-position (OOP) logic circuit and identified by the reference numeral 152, in control communication with the second initiator device 58, such as via the electrical wiring 154. For example, a common out-of-position logic circuit may be based on signal inputs such as whether or not an occupant is present or whether or not a seat belt is latched. To that end, the inflatable restraint system assembly 140 also includes occupant sensors 156, such as known in the art, in signal communication with the logic circuit 152, as signified by the line 158.

In the inflatable restraint assembly 140, the logic circuit 152 desirably serves to control when, e.g., under what circumstances, and if the second initiator device 58 is actuated and thus, by action of the cover element 120, the exit area from the combustion chamber 24 through which inflation fluid is discharged. In particular, firing the second initiator device 58 results in the cover element 120 moving adjacent the combustion housing second end 74, as described above, such that the cover sidewall 121 covers, blocks or otherwise obstructs gas passage through at least the exit ports 76b, while gas passage through the exit ports 76a remains uninterrupted. As a result, the cross sectional area of the exit from the chamber 24 can be appropriately adjusted dependent on the specific selected circumstances associated with a particular inflatable restraint deployment situation.

Figure 4:
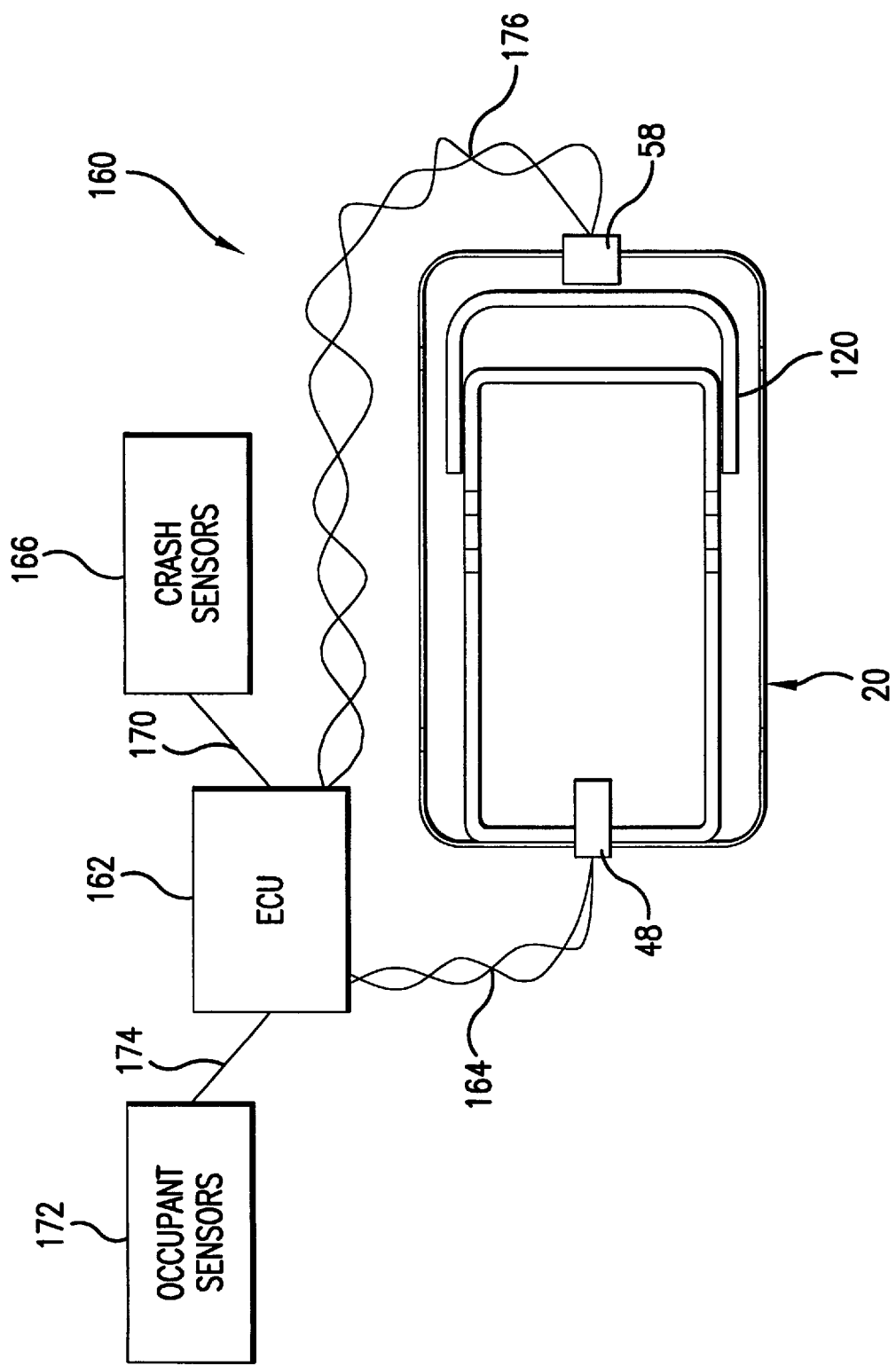
FIG. 4 is a simplified schematic illustrating an inflatable restraint system assembly in accordance with an alternative preferred embodiment of the invention.

FIG. 4 illustrates an inflatable restraint system assembly 160, in accordance with an alternative preferred embodiment of the invention. As described in greater detail below, the inflatable restraint system assembly 160 while having many similarities to the inflatable restraint system assembly 140 makes use of a single control unit to control both initiation of reaction of the combustible gas generant material contained within the associated inflator device as well as adjustment of the cross sectional area of the gas exit of the inflator device.

For example, the inflatable restraint system assembly 160, similar to the inflatable restraint system assembly 140 described above, incorporates the inflator device 20 and has an electronic control unit (ECU) 162 in control communication with the inflator device 20 such as via electrical wiring 164 to the first initiator 48. Also, similar to the inflatable restraint system assembly 140, the inflatable restraint system assembly 160 includes one or more crash sensors 166, such as known in the art, in signal communication with the ECU 162, as signified by the line 170.

The system assembly 160, however, also includes occupant sensors 172 in signal communication with the ECU 162, as signified by the line 174. The ECU 162, in turn, is joined or connected in control communication with the inflator device 20 via electrical wiring 176 to the second initiator device 178.

As will be appreciated, the ECU 162 has the control logic capability to control both initiation of reaction of the combustible gas generant material contained within the associated inflator device, such as via the actuation of the first initiator device 48, as well as adjustment of the cross sectional area of the gas exit of the inflator device, such as via the appropriate actuation of the second initiator device 58 and the associated release of the cover element 120. As described above, the cover element 120 can thus serve to effect adjustment of the cross sectional area of the gas exit in the inflator device 20 and thus the mass flow rate of gas from the inflator device.

While the invention has been described above (FIGS. 1 and 2, for example) relative to the inflator device 20 wherein the cover element 120 is one-time releasably secured to normally permit product gas flow through the exit ports 76 and, upon release, to limit product gas flow through the exit ports, the broader practice of the invention is not necessarily so limited. For example, the invention can, if desired, be practiced employing an inflator device wherein the cross sectional area of the exit can be adjusted more than one time.

Figure 5:
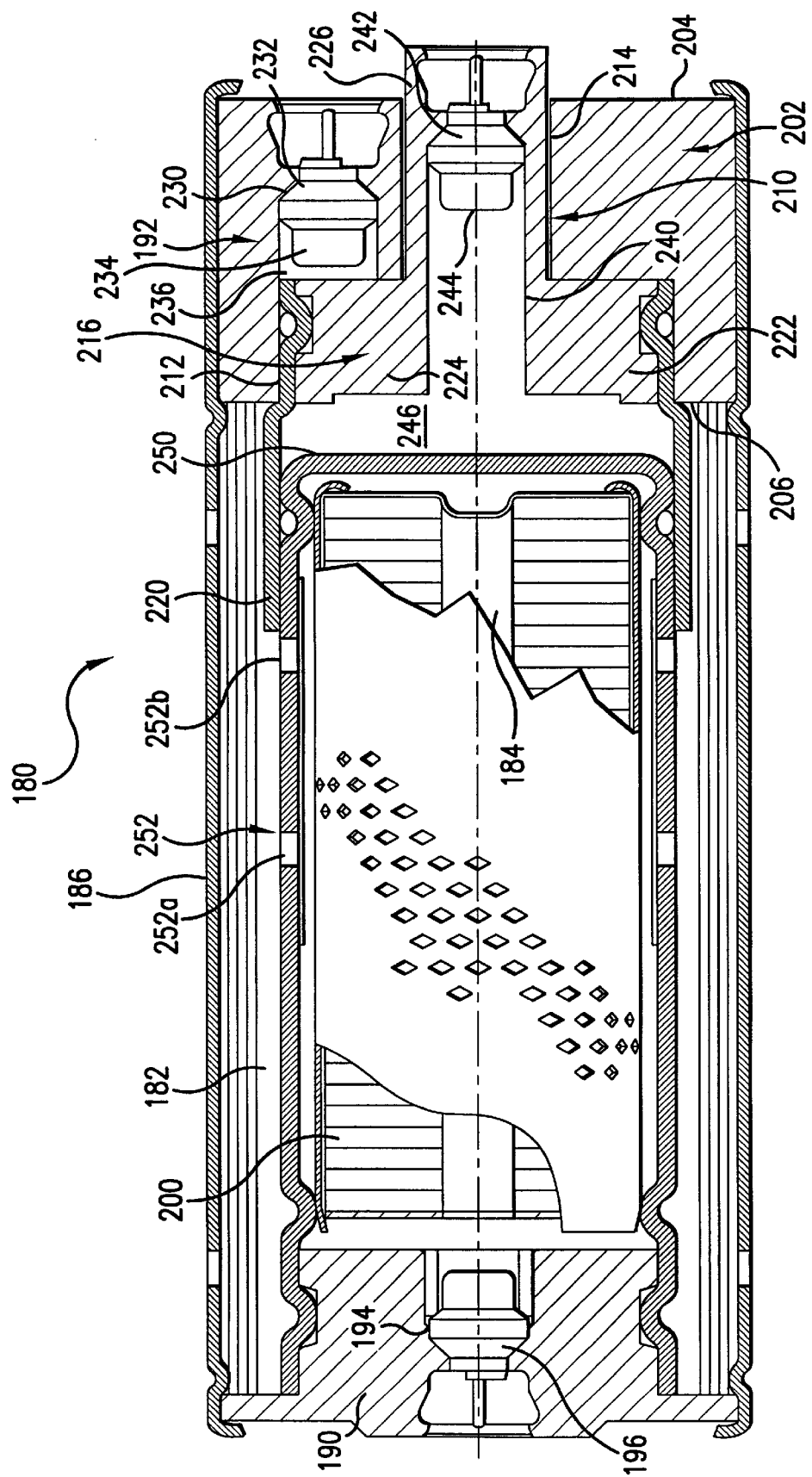
FIG. 5 is a partially in section, schematic drawing of an inflator in accordance with another preferred embodiment of the invention in a low rise rate (low mass flow rate) performance arrangement.
Figure 6:
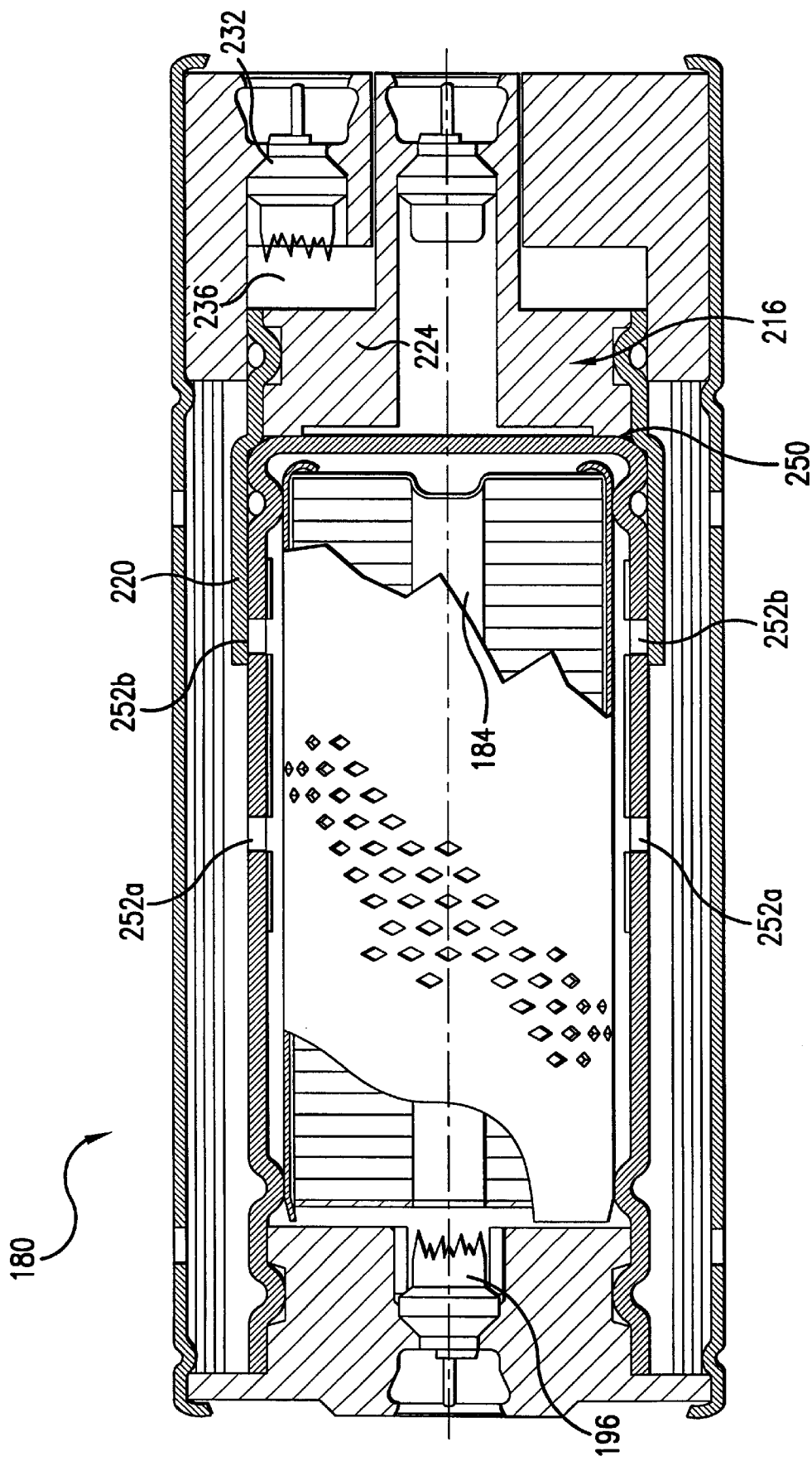
FIG. 6 is a partially in section, schematic drawing of the inflator embodiment shown in FIG. 5 but now activated to a high rise rate (high mass flow rate) performance arrangement.
Figure 7:
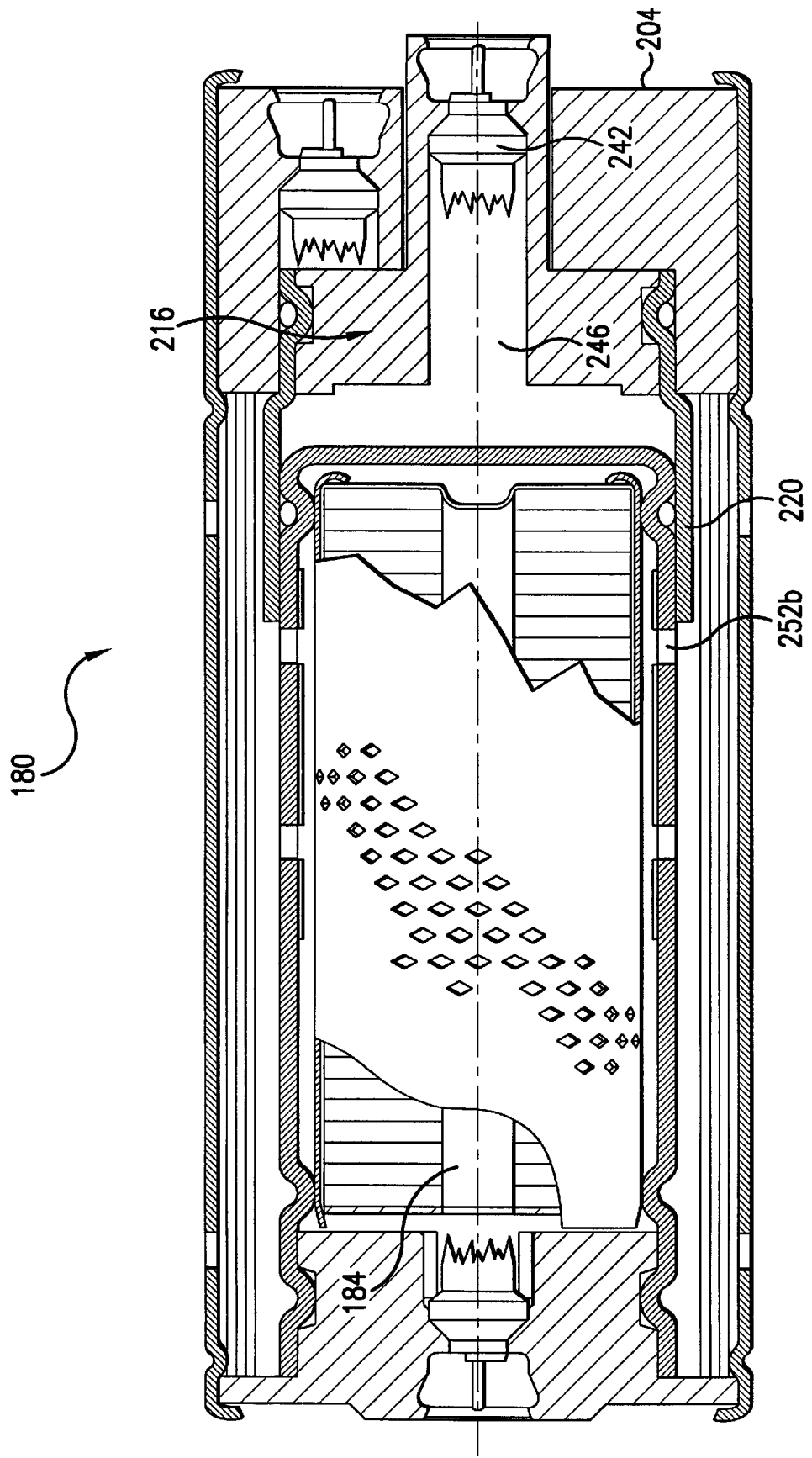
FIG. 7 is a partially in section, schematic drawing of the inflator embodiment shown in FIG. 6 but now activated and returned to a low rise rate (low mass flow rate) performance arrangement.

FIGS. 5–7 illustrate one such multiple adjustment inflator device 180 in accordance with a preferred embodiment of the invention under selected conditions of activation.

Turning first to FIG. 5, the inflator device 180 is shown in a static state wherein the inflator provides a low rise rate (e.g., a low inflation gas mass flow rate). The inflator 180 includes a diffusion chamber 182 and a combustion chamber 184, similar to the inflator device 20 described above. The diffusion chamber 182 is at least partially defined by an elongated generally cylindrical sleeve outer housing 186, a first base member 190, and an end assembly 192.

The first base member 190 is generally similar to that described above with the combustion chamber 184 extending therefrom. As in the above-described embodiment, the first end base 190 forms or includes a central opening 194 in which is received a first initiator device 196. The combustion chamber 184 desirably contains a gas generant material, e.g., a pyrotechnic, which has or exhibits a relatively high burn rate pressure dependency, e.g., has a burn rate pressure exponent of 0.4 or more, such as in the form of wafers 200.

The end assembly 192 includes a collar member 202 having an outer end 204 and an inner end 206. The collar member 202 also includes a central opening 210 extending between the outer end and the inner ends thereof. The central opening 210 is stepped, with an opening inner end 212 of larger diameter than the opening outer end 214.

The end assembly 192 further includes a cover piston combination 216 received in the end assembly central opening 210. The cover piston combination 216 includes a generally cylindrical cover sleeve 220 and an end piston 222 appropriately joined together. The end piston 222 is composed of a base 224 and a neck 226. The piston base 224 is received within the opening inner end 212 while the piston neck 226 is received within the opening outer end 214.

The collar member 202 includes an opening 230 in which is received a cover end first initiator device 232 having a discharge end 234. A first discharge volume 236, the use or function of which will be described in greater detail below, is desirably formed between the initiator discharge end 234 and the cover piston combination 216.

The cover piston combination 216 forms or includes a central opening 240 extending through the base and neck 224 and 226, respectively. A cover end second initiator device 242 is received at the neck end of the central opening 240. The cover end second initiator device 242 has a discharge end 244. As shown, a second discharge volume 246 is desirably formed between the initiator discharge end 244 and an end 250 of the combustion chamber 184.

The inflator device 180 includes a plurality of exit ports, generally designated by the reference numeral 252, wherethrough inflation fluid, e.g., inflation gas, formed, produced or otherwise provided by the combustion chamber 184 can be properly discharged from the combustion chamber 184, such as into the diffusion chamber 182. For example, and as shown, such exit ports 252 may be in the form or constitute first and second sets of exit ports, 252a and 252b, respectively.

In the state shown in FIG. 5, the cover piston combination 216 is positioned such that flow through or out of the exit ports 252a and 252b is generally uninterrupted or impeded by cover sleeve 220. Thus, when employing gas generant materials, e.g., pyrotechnics, which have or exhibit a relatively high burn rate pressure dependency, e.g., have a burn rate pressure exponent of 0.4 or more, such as identified above, such cover positioning can desirably produce or result in reduced or lower mass flow rates of produced or formed gases, e.g., such performance arrangement produces or results in a "low rise rate"("low mass flow rate") of inflation gas.

Turning now to FIG. 6, the inflator device 180 is now shown after actuation and firing of both the first initiator device 196 and the cover end first initiator device 232. With such firing, the cover end first initiator device 232 discharges into the first discharge volume 236, increasing the pressure therewithin and resulting in movement of the cover piston combination 216 toward the combustion chamber 184 such that the end piston base 224 is appropriately adjacent the combustion chamber end 250 and the cover sleeve 220 covers, blocks or otherwise obstructs gas passage through at least the exit ports 252b, while the exit ports 252a remain open or otherwise unimpeded by the cover sleeve 220.

Thus, as described above, the cross sectional area of the exit from the chamber 184, can be adjusted to result or produce in a higher or greater pressure within the chamber. Thus, when the invention is practiced employing gas generant materials which have or exhibit a relatively high burn rate pressure dependency, as described above, such higher combustion pressures can produce or result in higher mass flow rates of produced or formed gases. Consequently, such an arrangement constitutes what is termed herein as a "high rise rate"("high mass flow rate") performance arrangement.

As will be appreciated by those skilled in the art and guided by the teachings herein provided, the adjustment of the exit area can be selected dependent on one or more of the above-identified product gas output performance factors.

Turning now to FIG. 7, the inflator device 180 is now shown after the subsequent actuation and firing of the cover end second initiator device 242. With such firing, the cover end second initiator device 242 discharges into the second discharge volume 246, increasing the pressure therewithin and resulting in movement of the cover piston combination 216 back toward the collar member outer end 204 such that the cover sleeve 220 no longer covers, blocks or otherwise obstructs gas passage through the exit ports 252b. As a result, the cross sectional area of the exit from the combustion chamber 184 is adjusted such as to reduce the pressure therewithin. Thus, when the invention is practiced employing preferred gas generant materials which have or exhibit a relatively high burn rate pressure dependency, such lower combustion pressures can produce or result in lower mass flow rates of produced or formed gases and consequently lower rise rates, as may be desired in certain deployment situations.

It will be appreciated that inflator devices in accordance with the invention, including those that permit or are suited for adjustment of the exit area more than once, a selected plurality of times more than twice or even substantially continuously are susceptible to various designs, constructions and modes of operation and are herein envisioned and encompassed.

Figure 8:
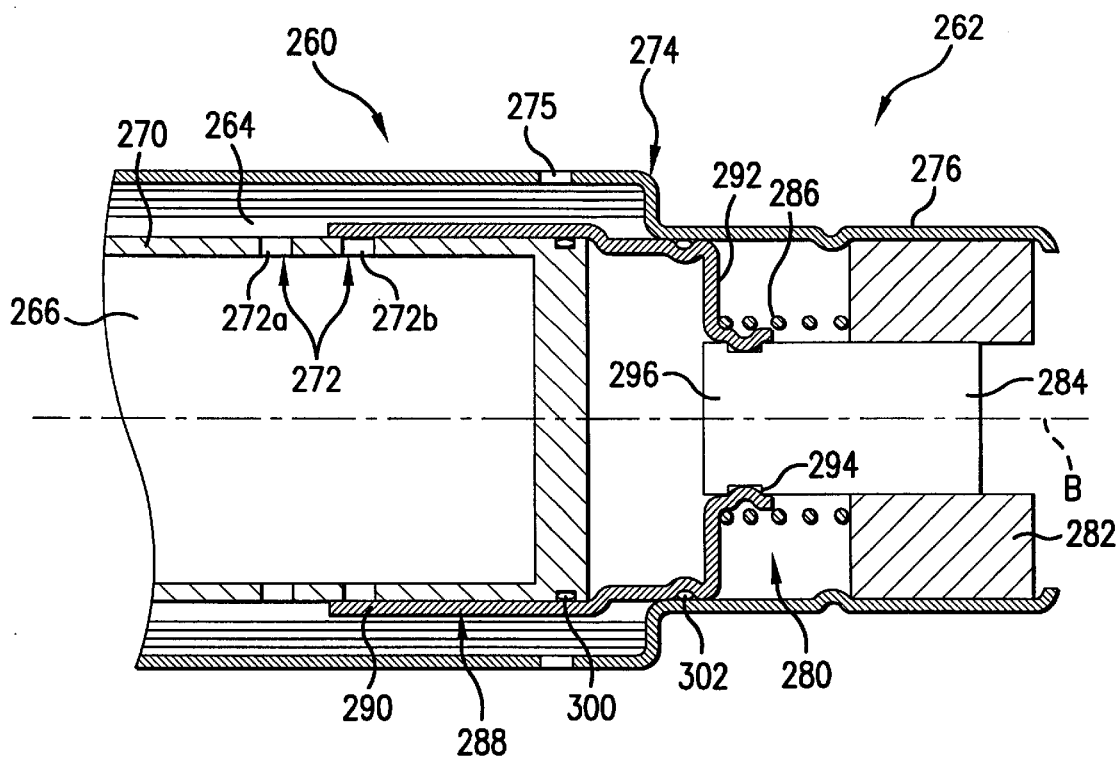
FIG. 8 is a fragmentary partially in section, schematic drawing of a solenoid-including inflator in accordance with another preferred embodiment of the invention.

For example, FIG. 8 illustrates a fragmentary portion, designated by the reference numeral 260, of an inflator 262 in accordance with another preferred embodiment. The inflator fragmentary portion 260 generally corresponds to the inflator end portion 35, shown in FIG. 1.

The inflator 262, similar to the inflator 20 described above, forms or otherwise includes a diffusion chamber 264 and a combustion chamber 266, each generally concentrically centered along an axis, here designated by the reference character B, and elongated relative thereto. As in the inflator 20, the diffusion chamber 264 is in generally radially surrounding relationship with or to the combustion chamber 266. The combustion chamber 266, its contents and its operation are generally similar to the combustion chamber 24 of the inflator 20 described above and are thus not here shown or otherwise specifically discussed.

The combustion chamber 266 is at least partially defined by an elongated generally cylindrical inner housing 270 which includes a plurality of exit ports, generally designated by the reference numeral 272, wherethrough inflation fluid, e.g., inflation gas, formed, produced or otherwise provided by or from the combustion chamber 266 can be properly discharged, such as into the diffusion chamber 264. The exit ports 272, as shown, may be in the form of or otherwise constitute first and second sets of exit ports, 272a and 272b, respectively.

In the interest of facilitating description, the following description of the inflator 262 will primarily focus on differences between the inflator 262 and the above-described inflator 20.

The diffusion chamber 264 is at least partially defined by an elongated generally cylindrical sleeve outer housing, here designated by the reference numeral 274. The outer housing 274 forms or includes exit openings 275 wherethrough inflation gas can be released from the inflator device 262 into an associated inflatable device (not shown) such as an inflatable restraint airbag cushion. The outer housing also includes a necked-down end 276 in which is received a solenoid and cover element assembly combination 280. In particular, the assembly combination 280 includes an electromagnet 282, such as in the form of a solenoid or the like, a piston 284, a spring element 286 and a cover element 288.

The cover element 288 includes a portion in the general shape of a cup with a generally cylindrical sidewall 290 situated adjacent the inner housing 270. The cover element 288 also includes a base portion 292 such as joined or secured to the piston 284. In the illustrated embodiment, the cover element base portion 292 is crimped or otherwise secured to the piston at a radial groove 294 formed in an end 296 of the piston 284. In the at rest or static state, such as when the electromagnet 282 is unenergized, the spring element 286 acts against the cover element 288 such that the sidewall 290 covers the exit ports 272b.

In order to avoid or minimize passage of gas out of the outer housing end 276, a first O-ring 300 is situated between the cover element sidewall 290 and the inner housing 270 and a second O-ring 302 is situated between the cover element sidewall 290 and the outer housing 274.

Figure 9:
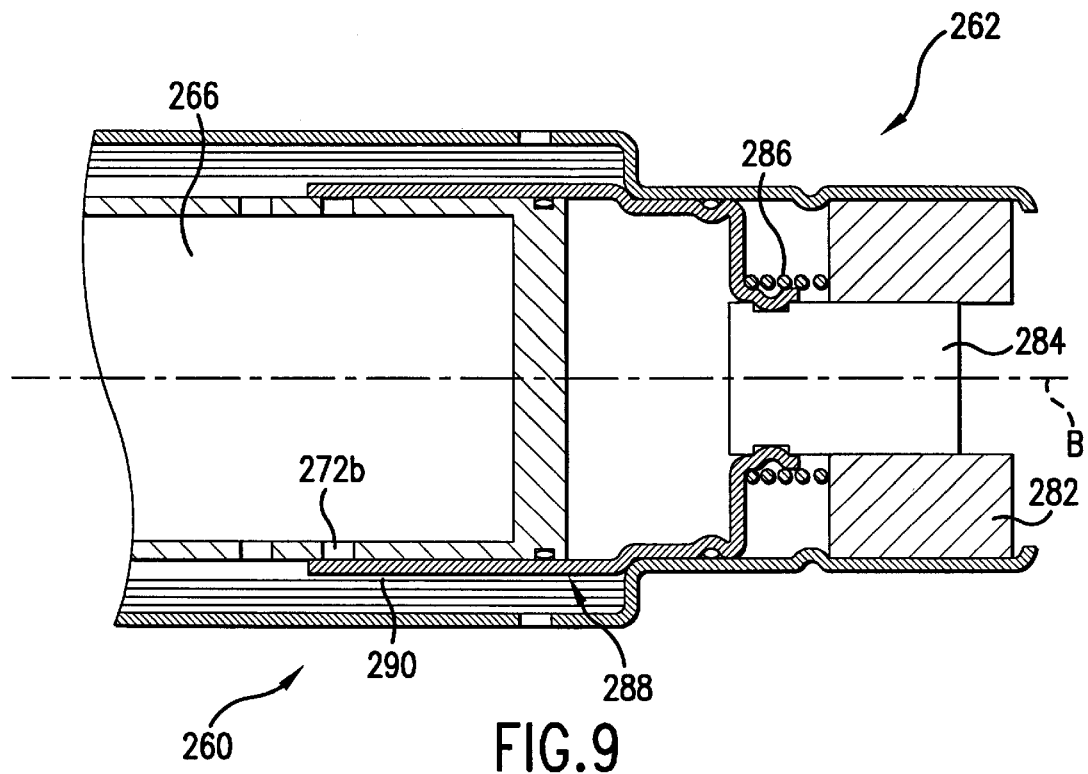
FIG. 9 is a fragmentary partially in section, schematic drawing of the solenoid-including inflator shown in FIG. 8 but now with the solenoid in an energized state or condition.

FIG. 9 illustrates the fragmentary portion 260 of the inflator 262, shown in FIG. 8 but now upon activation or energization of the solenoid electromagnet 282. As shown, with such solenoid activation, the piston 284 is drawn towards the solenoid electromagnet 282. As a result, the cover element 288, joined or secured to the piston 284, is correspondingly also drawn in the direction of the solenoid electromagnet 282, with the spring element 286 correspondingly being contracted. The cover element 288 is moved such that the cover element sidewall 290 no longer covers or otherwise generally impedes gas flow through the exit ports 272b.

Thus, the inflator 262 is designed to permit and facilitate the adjustment of the cross sectional area of the exit from the chamber 266 in a manner which permits such exit area adjustment once, twice, a selected plurality number of times or substantially continuously, as may be desired for particular inflation circumstances or installation requirements. Consequently, such as when the invention is practiced employing gas generant materials which have or exhibit the above-described burn rate pressure dependency, those skilled in the art and guided by the teachings herein provided will appreciate that the exit area of such inflator assemblies can be adjusted and controlled to provide particularly desired inflation performance characteristics, e.g., inflatable device rise rate.

Figure 10:
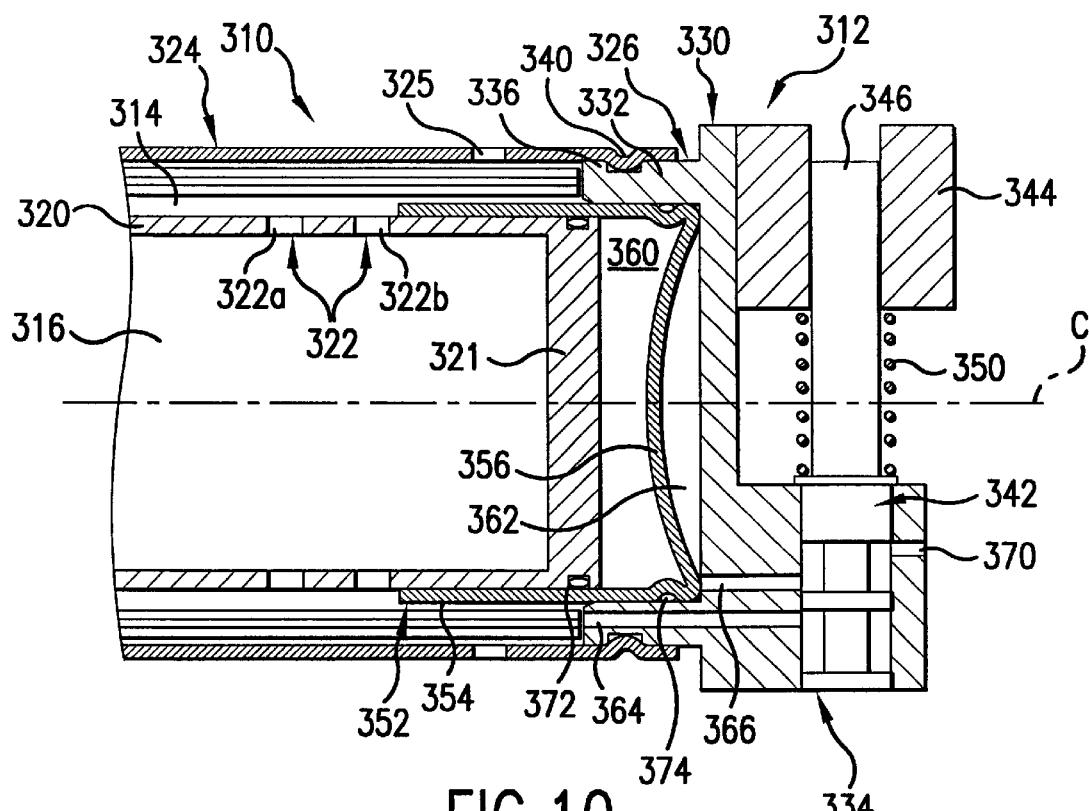
FIG. 10 is a fragmentary partially in section, schematic drawing of a solenoid-including inflator in accordance with yet another preferred embodiment of the invention.

FIG. 10 illustrates a fragmentary portion, designated by the reference numeral 310, of a solenoid-including inflator 312 in accordance with yet another preferred embodiment. The inflator fragmentary portion 310 generally corresponds to the inflator end portion 35, shown in FIG. 1 and the inflator fragmentary portion 260, shown in FIGS. 8 and 9, but now utilizing generated pressure to assist in movement of an assembly-included piston.

The inflator 312, similar to the inflator 20 described above, forms or otherwise includes a diffusion chamber 314 and a combustion chamber 316, each generally concentrically centered along an axis, designated by the reference character C, and elongated relative thereto. Similar to above-described inflator embodiments, the diffusion chamber 314 is in generally radially surrounding relationship with or to the combustion chamber 316. The combustion chamber 316, its contents and its operation are similar to the combustion chamber 24 of the inflator 20 described above and are thus not here shown or otherwise specifically discussed.

The combustion chamber 316 is at least partially defined by an elongated generally cylindrical inner housing 320 having a closed end 321. The inner housing 320 includes a plurality of exit ports, generally designated by the reference numeral 322, wherethrough inflation fluid, e.g., inflation gas, formed, produced or otherwise provided by or from the combustion chamber 316 can be properly discharged, such as into the diffusion chamber 314. The exit ports 322 may be in the form of or otherwise constitute first and second sets of exit ports, 322a and 322b, respectively.

In the interest of facilitating description, the following description of the inflator 312 will primarily focus on differences between the inflator 312 and the above-described inflator 20.

The diffusion chamber 314 is at least partially defined by an elongated generally cylindrical sleeve outer housing, here designated by the reference numeral 324. The outer housing 324 forms or includes exit openings 325 wherethrough inflation gas can be released from the inflator device 312 into an associated inflatable device (not shown) such as an inflatable restraint airbag cushion. The outer housing 324 includes an open end 326 in which is received a control block 330. The control block 330 includes a generally cylindrical inward directed connecting flange 332 and an outward directed spool region 334. The connecting flange 332 includes an outer radial groove 336 whereat the outer housing 324 can be joined or attached such as by means of a radial crimp 340 formed in the outer housing. The valve flange 334 receives a spool valve 342 or the like, with an electromagnet 344, such as in the form of a solenoid or the like, a piston 346 and a spring element 350.

A cover element 352 is generally situated between the inner housing closed end 321 and the control block 330. The cover element 352 is generally cup-shaped and includes a generally cylindrical sidewall 354 and a convex base wall 356. An inner volume 360 is formed or situated between the inner housing closed end 321 and the cover element 352. An outer volume 362 is formed or situated between the cover element base wall 356 and the control block 330.

The control block 330 includes a first main passageway 364 to permit fluid communication between the diffusion chamber 314 and the spool region 334. The control block 330 also includes a second main passageway 366 to permit fluid communication between the spool region 334 and the outer volume 362. The control block further includes an exit passageway 370 to permit fluid communication between the spool region 334 and the exterior of the inflatable device 312.

In order to avoid or minimize undesired passage of gas between respective adjacent components of the inflator device 312, a first O-ring 372 is situated between the cover element sidewall 354 and the inner housing 320 and a second O-ring 374 is situated between the cover element sidewall 354 and the connecting flange 332.

In the at rest condition or the static state shown in FIG. 10, the spool valve 342 is positioned such that fluid pressure within the diffusion chamber 314 is communicated through the first main passageway 364 to the spool region 334 but is blocked to the exit passageway 370 and blocked to the second main passageway 366. Thus, when the inflator 312 is in such state, the generated pressure within the diffusion chamber 314 acts on the cover element 352 such that the cover element 352 avoids blocking or otherwise undesirably impeding gas flow through the exit ports 322b. The second main passageway 366, however, is in free communication with the exit passageway 370, via the spool region 334.

Figure 11:
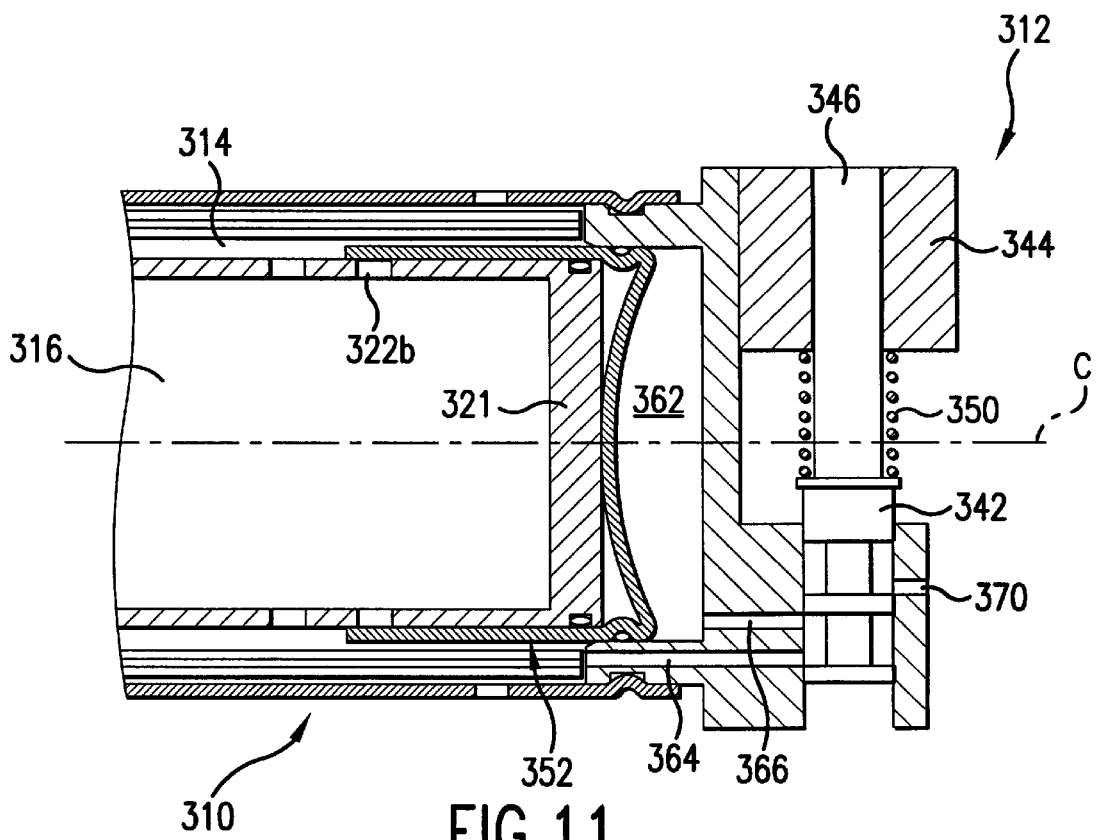
FIG. 11 is a fragmentary partially in section, schematic drawing of the solenoid-including inflator shown in FIG. 10 but now with the solenoid in an energized state or condition.

FIG. 11 illustrates the fragmentary portion 310 of the inflator 312, shown in FIG. 10 but now upon activation or energization of the solenoid electromagnet 344. As shown, with such solenoid activation, the piston 346 is drawn towards the solenoid electromagnet 344 with the spring element 350 correspondingly being contracted. The spool valve 342 is moved to a position such that fluid pressure within the diffusion chamber 314 is communicated through the first main passageway 364 to the second main passageway 366 and not to the exit passageway 370. The fluid pressure is thus further communicated to outer volume 362 such as to result in the cover element 352 moving towards the inner housing closed end 321 with the cover element sidewall covering or otherwise blocking or impeding gas flow through the exit ports 322b.

As will be appreciated, the inflator 312 can upon proper actuation be subsequently returned to the state shown in FIG. 10. With such return, the outer volume 362 is desirably vented through the second main passageway 366 and subsequently out through the exit passageway 370.

Thus, in accordance with the invention, the inflator 312 is designed to permit and facilitate the adjustment of the cross sectional area of the exit from the chamber 316 in a manner which permits such exit area adjustment once, twice, a selected plurality number of times or substantially continuously, as may be desired for particular inflation circumstances or installation requirements. Consequently, such as when the invention is practiced employing gas generant materials which have or exhibit the above-described burn rate pressure dependency, those skilled in the art and guided by the teachings herein provided will appreciate that the exit area of such inflator assemblies can be adjusted and controlled to provide particularly desired inflation performance characteristics.

While the invention has been described above with reference to inflator device embodiments which, via a selected control arrangement, adjust the device gas exit cross sectional area via a cover element movable in response to the control signal from the control assembly to cover selected of the exit ports from the device, it will be understood that the broader practice of the invention is not necessarily so limited.

Figure 12:
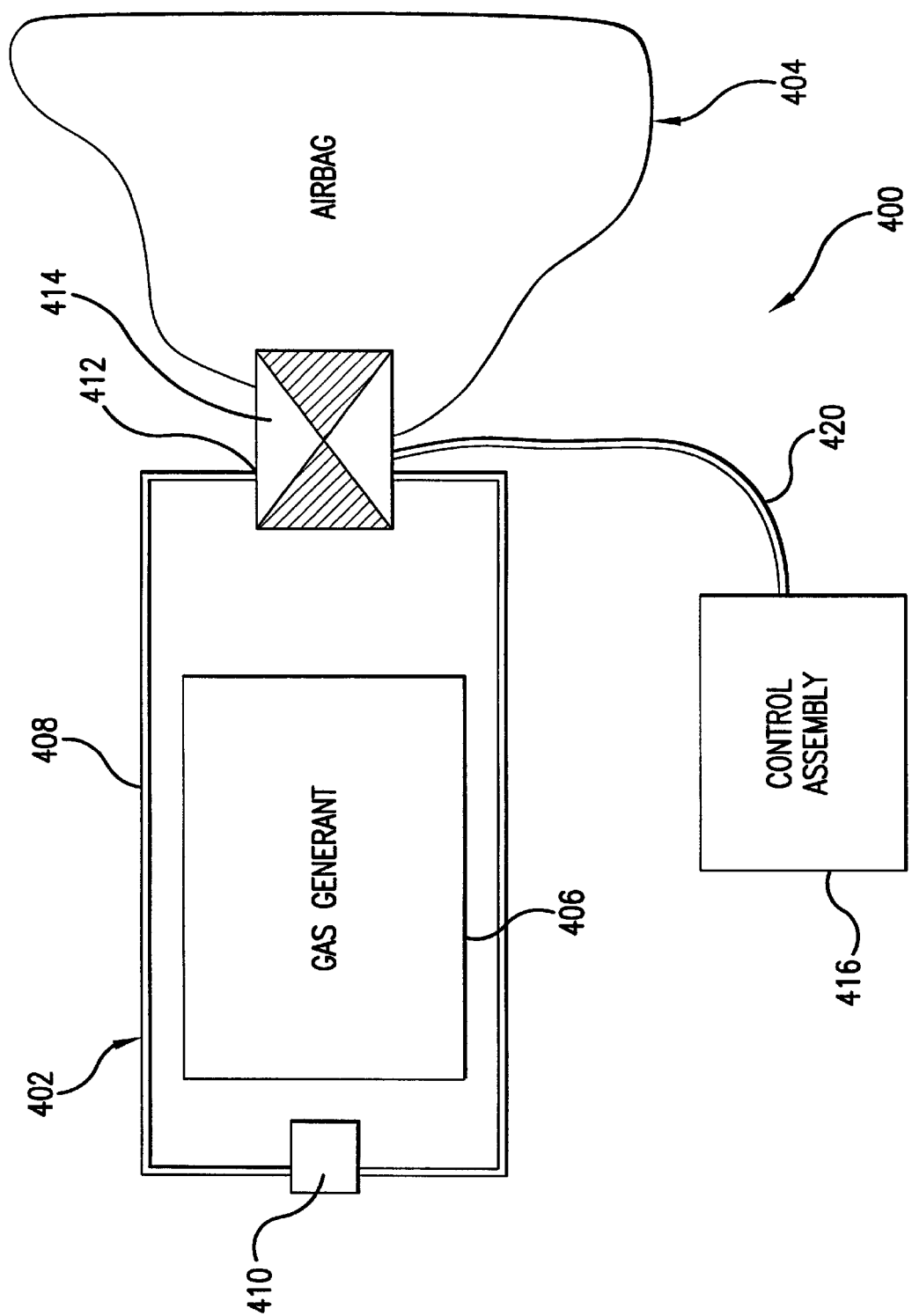
FIG. 12 is a simplified schematic illustrating an inflatable restraint system assembly incorporating an inflator in accordance with an alternative preferred embodiment of the invention.

For example, FIG. 12 illustrates an inflatable restraint system assembly 400 incorporating an inflator 402, in accordance with one such alternative preferred embodiment of the invention, in inflation fluid communication with an inflatable device 404, such as in the form of an airbag cushion, as is known in the art. The inflator 402 is schematically shown as including inner and outer housings 406 and 408, respectively, similar to the inflator devices described above. The inner housing 406 contains a supply of reactable gas generant material, such as described above. The inflator 402 also includes an initiator device 410 and a discharge or exit opening 412. As with the inflator devices described above and as is known in the art, the initiator device 410 is effective, upon actuation, to ignite the gas generant material.

The inflatable restraint system assembly 400 also includes a valve 414 having adjustable flow through area such as to permit control of the flow of inflation fluid from the inflator 402 into the inflatable device 404. In particular, the inflatable restraint system assembly 400 also includes a control assembly 416 in operational control communication with the valve 414, as signified by the control lines 420, such as to adjust or otherwise control the fluid flow through area therein.

As will be appreciated by those skilled in the art and guided by the teachings herein provided, the inflatable restraint system assembly 400 provides an alternative design or mechanism by which the cross sectional area of the exit from an inflator device or apparatus can be adjusted. Similar to the above-described embodiments, such exit area adjustment can then effect the pressure within the respective inflator chamber and, when used in conjunction with gas generant materials which have or exhibit the above-described burn rate pressure dependency, desirably alter or adjust inflation gas output, such as rise rate, for example.

While assembly combinations in accordance with the invention may include such or similar valves as a separate assembly component, to facilitate assembly design, manufacture, production, installation and/or operation it is presently believed preferable to include such or similar valve as a part of the inflator component included in assemblies in accordance with the invention.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Example 1

In this example, a test inflator device similar in construction to the inflator 180 described above, was used.

The test inflator contained 117 grams of a gas generant composition having a high burn rate pressure dependency, in accordance with certain preferred embodiments of the invention. In particular, a metal ammine nitrate-containing azide-free gas generant composition such as identified above and disclosed in U.S. patent application Ser. No. 09/221,910, filed Dec. 28, 1998, now U.S. Pat. No. 6,103,030, issued Aug. 15, 2000, was used.

The gas generant material was configured into 33 annular wafers each 0.10 inch thick and having an inner diameter of 0.32 inch and an outside diameter of 1.35 inch. The bores of the gas generant wafers were coated with a total of 1.4 grams of a selected ignition enhancer.

Each of the first initiator device "192" and first and second cover end initiator devices "232" and "242," respectively, contained 110 mg of zirconium potassium perchlorate ignition material.

The test inflator included generally circular exit ports "252" each having a diameter of 0.193 inch. The exit ports "252" were composed of a first set "252a" of six (6) exit ports and a second set "252b" of four (4) exit ports. The test inflator included first and second sets of twelve (12) generally circular diffusion chamber exit openings, each having a diameter of 0.25 inch, generally situate at opposite ends of the cylindrical diffuser sleeve outer housing.

The test inflator device was mated to a 100 liter tank equipped with a pressure transducer to measure the pressure within the tank. The test inflator device was also provided with a pressure transducer to measure the pressure within the combustion chamber thereof.

Operation

The test inflator was initially upon actuation of the first initiator device "192" in the state shown in FIG. 5, with the cover sleeve "200" positioned such as to permit fluid flow through both the exit port ports "252a" and "252b." At 15 ms after initial actuation, the first cover end initiator device "232" was fired, such that the test inflator corresponded to the state shown in FIG. 6 and such that cover sleeve obstructed fluid flow through the exit port "252b." At 35 ms after initial actuation, the second cover end initiator device "242" was fired, such that the test inflator corresponded to the state shown in FIG. 7 such as to again permit fluid flow through both the exit port ports "252a" and "252b."

Combustion chamber pressure vs. time performance and tank pressure vs. time performance were recorded by means of a data collection system. Such pressure vs. time performances realized with the test inflator device is shown in FIG. 13.

Discussion of Results

Figure 13:
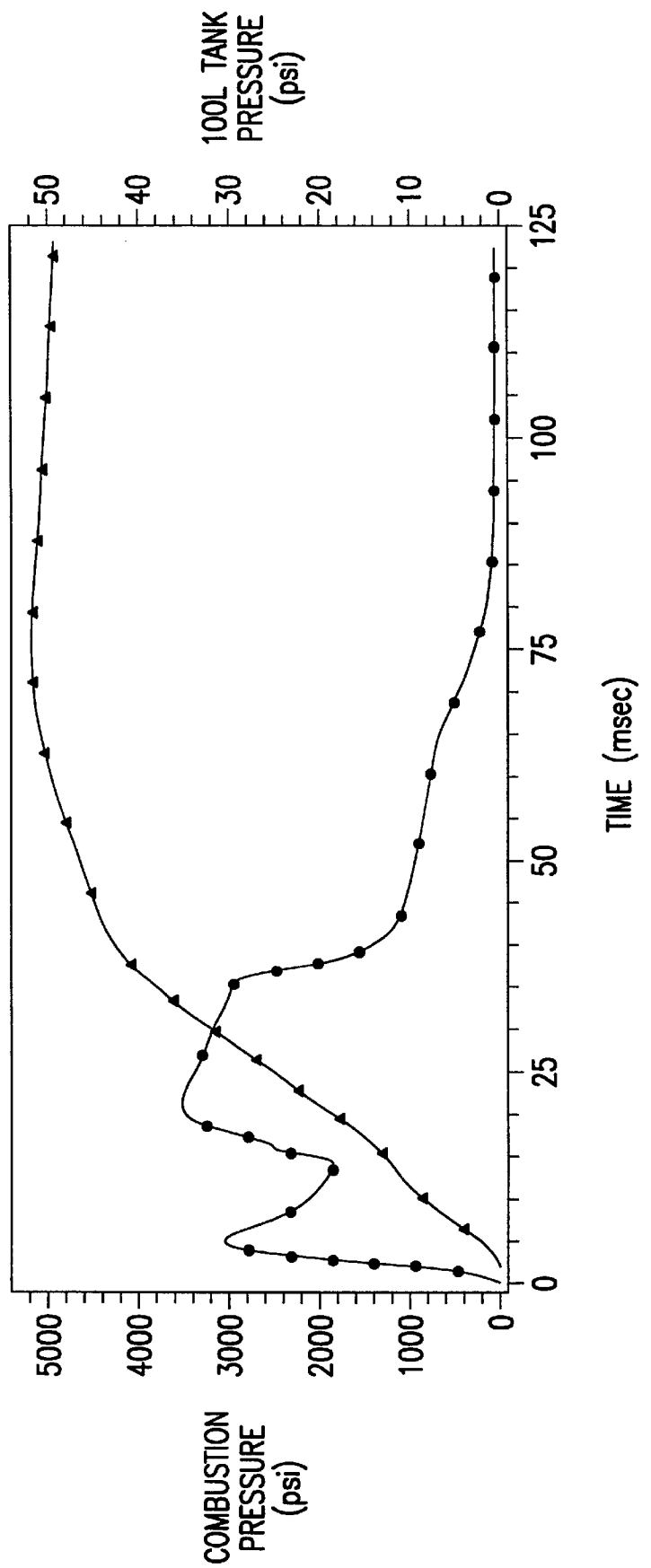
FIG. 13 is a graphical depiction of tank pressure and combustion chamber pressure, respectively, as a function of time performance realized with the test inflator of Example 1.

The combustion pressure trace shown in FIG. 13 shows that after an initial pressure spike associated with the reaction of the ignition charge and ignition enhancer material, the pressure in the combustion chamber began to decline. However, at 15 ms after initial actuation and upon firing of the first cover end initiator device, the combustion chamber pressure increased. Such combustion chamber pressure increase is entirely consistent with the exit ports "252b" being blocked such as to result in a pressure build-up or increase within the combustion chamber. Further, the slope of the tank pressure trace also increased after initial actuation and upon firing of the first cover end initiator device. Again, such increase is entirely consistent with the exit ports "252b" being blocked such as to result in a pressure build-up or increase within the combustion chamber and combustion of a gas generant material having a relatively high burn rate pressure dependency, as described herein.

At the point in time of 35 ms after initial actuation and upon firing of the second cover end initiator device, the combustion pressure trace began to steeply decline while the slope of the of the tank pressure trace reduced. Such performance is entirely consistent with flow through the exit ports "252b" no longer being blocked such the pressure within the combustion chamber is reduced and the burn rate of the gas generant material being correspondingly reduced.

This example highlights the inflator performance variability and control potential of inflator devices in accordance with the invention. As will be appreciated, inflator devices in accordance with the invention can, such as through selected or proper control, be used to supply inflation gas in a fashion specifically suited for particular airbag cushion deployment events or situations.

Examples 2–6

These examples each employed the same test inflator device employed in Example 1 but now using the firing regimes for the first and second cover end initiator devices shown in TABLE 1, below, where t=0 is the point in time at which the first initiator device "192" is actuated or fired.

TABLE 1

| EXAMPLE | Cover End Initiators - when, if fired | |
|---------|-------------|-------------|
|         | FIRST       | SECOND      |
| 2       | not fired   | not fired   |
| 3       | t = 0       | not fired   |
| 4       | t = 0       | t = 20 ms   |
| 5       | t = 35 ms   | not fired   |
| 6       | t = 20 ms   | t = 40 ms   |

Results

Figure 14:
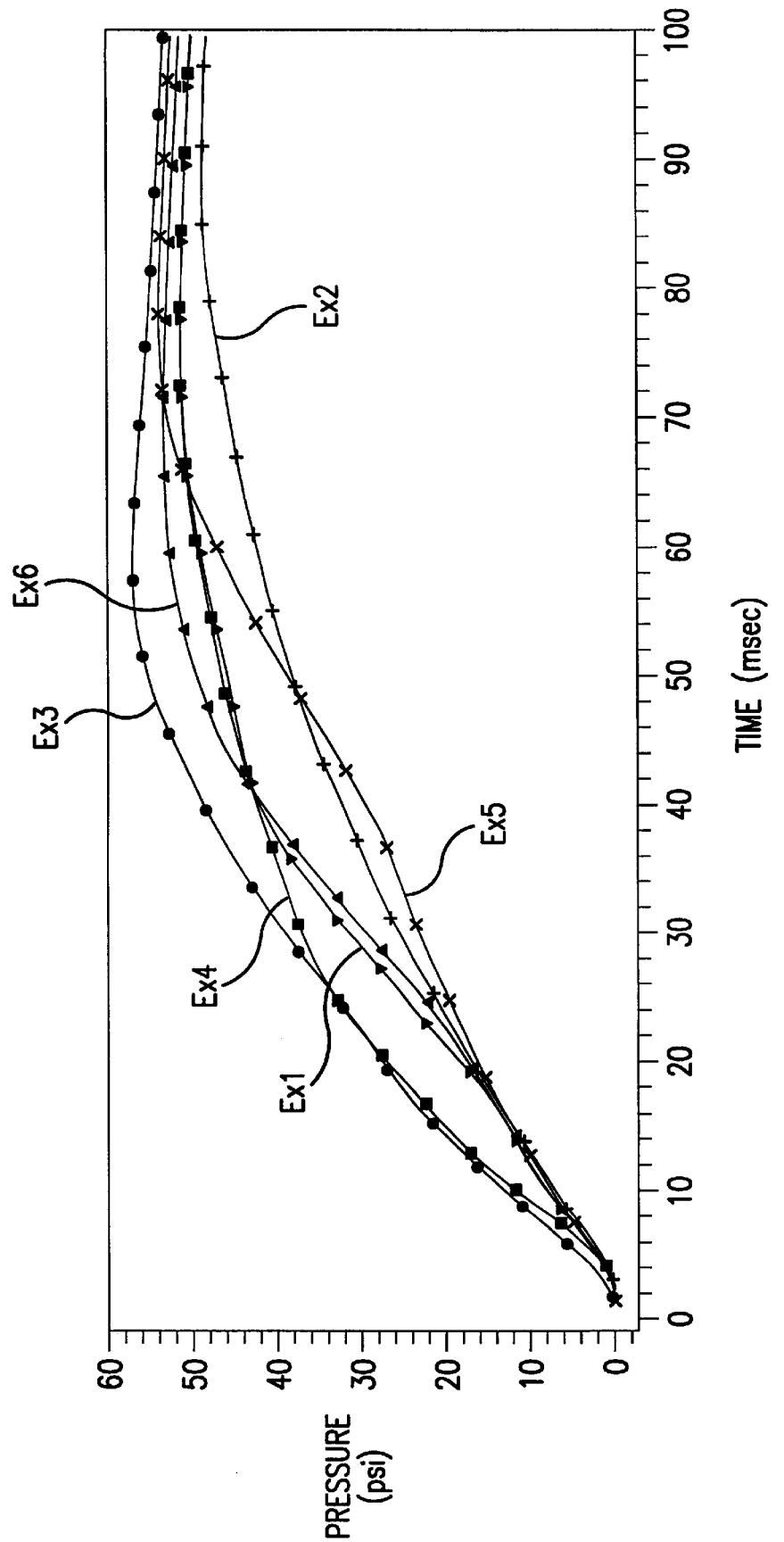
FIG. 14 is a graphical depiction of tank pressure as a function of time performance realized with a test inflator in the Examples, under selected operating schemes.

FIG. 14 is a graphical depiction of tank pressure as a function of time performance realized with a test inflator in Examples 1–6. As illustrated by these examples and as will be appreciated by those skilled in the art and guided by the teachings herein provided, the inflation performance of inflator devices in accordance with the invention can be specifically tailored to the meet the requirements of a wide variety inflation situations and needs.

While the invention has been described above with reference to the inflation of inflatable devices in the form of inflatable restraint airbag cushions, it will be appreciated that the broader practice of the invention is not necessarily so limited.

Thus, the invention provides combinations and methods which utilize or facilitate the use of combustible material-based adaptive performance inflator devices of either or both simplified design and construction. Further, such inflator devices and associated methods may desirably incorporate or be based on the inclusion and use of azide-free pyrotechnics, such as those which have or exhibit a relatively high burn rate pressure dependency, e.g., a burn rate pressure exponent of 0.4 or more. Still further, the invention provides adaptive performance inflatable restraint assembly combinations which are conducive for use in conjunction with relatively simple control arrangements. Yet still further, the invention provides adaptive performance inflatable restraint assembly combinations such as may more readily be used, if desired, in a retrofit fashion within various existing inflatable restraint installations.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A combination comprising:

an inflator device including a first chamber wherein a supply of a combustible gas generant material having a burn rate which is pressure dependent is burned to produce gas, the inflator device also including an exit of adjustable cross sectional area in fluid communication with the first chamber and wherethrough at least a portion of the product gas can exit the inflator device and a control assembly in operational control communication with the inflator device, the control assembly providing a reaction initiating signal to the inflator device to initiate reaction of at least a portion of the combustible gas generant material and a control signal to the inflator device to effect adjustment of the cross sectional area of the exit and at least one chosen product gas output performance factor.

2. The combination of claim 1 wherein the exit of adjustable cross sectional area comprises at least one first exit port and at least one second exit port with a cover element movable in response to the control signal from the control assembly to selectively cover the at least one second exit port.

3. The combination of claim 2 wherein the cover element is releasably secured to normally permit product gas flow through the at least one second exit port and, upon release, to limit product gas flow through the at least one second exit port.

4. The combination of claim 3 wherein, upon release, the cover element prevents product gas flow through the at least one second exit port.

5. The combination of claim 3 comprising a pyrotechnic device actuatable in response to the control signal from the control assembly to release the cover element and limit product gas flow through the at least one second exit port.

6. The combination of claim 3 wherein the cover element is repeatably releasably secured to normally permit product gas flow through the at least one second exit port and, upon release, to limit product gas flow through the at least one second exit port.

7. The combination of claim 3 wherein an electromagnet releasably secures the cover element.

8. The combination of claim 2 wherein the exit of adjustable cross sectional area comprises a plurality of first exit ports.

9. The combination of claim 2 wherein the exit of adjustable cross sectional area comprises a plurality of second exit ports.

10. The combination of claim 2 wherein the inflator device includes at least one cover element movement initiator device actuable to produce a discharge to effect movement of the cover element.

11. The combination of claim 10 wherein the inflator device includes at least first and second cover element movement initiator devices each actuable to produce a discharge to effect movement of the cover element.

12. The combination of claim 1 wherein the exit of adjustable cross sectional area comprises at least one first exit port in fluid communication with a valve having adjustable flow through area.

13. The combination of claim 1 wherein the product gas output performance factor is mass flow rate.

14. The combination of claim 1 wherein the pressure dependency of the burn rate of the combustible gas generant material, as represented by n in the burn rate expression:

$$r_b = k(P)^n$$

where, $r_b$ is the burn rate of the gas generant material, k is a constant, P is the combustion pressure, and n is the slope of a linear regression line drawn through a log-log plot of burn rate versus pressure, is at least about 0.4.

15. A combination comprising:
an inflator device including a first chamber wherein a supply of a pyrotechnic gas generant material having a burn rate which is pressure dependent is burned to produce gas, the inflator device having an exit of adjustable cross sectional area, the exit of adjustable cross sectional area including a plurality of first exit ports in fluid communication with the first chamber and wherethrough at least a portion of the product gas can exit the inflator device and a plurality of second exit ports also in fluid communication with the first chamber with a cover element movable to selectively cover the second exit ports and prevent product gas to exit the inflator device through the second exit ports, the inflator device also having an adjustable mass flow rate of product gas therefrom and a control assembly in operational control communication with the inflator device, the control assembly providing a control signal to the inflator device to effect movement of the cover element to selectively cover the second exit ports and the mass flow rate of product gas from the inflator device.

16. The combination of claim 15 wherein, in response to receipt of a control signal from an associated control assembly, the cross sectional area of the exit is reduced and the burn rate of the gas generant material is increased.

17. The combination of claim 15 wherein, in response to receipt of a control signal from an associated control assembly, the cross sectional area of the exit is increased and the burn rate of the gas generant material is decreased.

18. A method for adjusting inflation gas output from a device having a first chamber wherein a supply of a combustible gas generant material is burned to produce gas, the device having an exit of adjustable cross sectional area in fluid communication with the first chamber and wherethrough at least a portion of the produced gas can exit the device, the method comprising:
adjusting the cross sectional area of the exit in response to receipt of a control signal from an associated control assembly, the control signal being dependent on at least one chosen product gas output performance factor for the device.

19. The method of claim 18 wherein, in response to receipt of a control signal from an associated control assembly, the cross sectional area of the exit is reduced and the burn rate of the gas generant material is increased.

20. The method of claim 18 wherein, in response to receipt of a control signal from an associated control assembly, the cross sectional area of the exit is increased and the burn rate of the gas generant material is decreased.

21. The method of claim 18 wherein the device includes at least one first exit port and at least one second exit port with a cover element movable in response to the control signal from the control assembly to selectively cover the at least one second exit port and wherein, in response to receipt of a control signal from an associated control assembly, the cover element selectively covers the at least one second exit port.

22. The method of claim 21 wherein, in response to receipt of a control signal from an associated control assembly, the cover element is moved and covers the at least one second exit port.

23. The method of claim 21 wherein, in response to receipt of a control signal from an associated control assembly, the cover element is moved and uncovers the at least one second exit port.

24. A method for adjusting inflation gas output from a device in view of at least one selected inflatable restraint operating condition, wherein the device includes a first chamber wherein in response to a reaction initiating signal a supply of a combustible gas generant material is burned to produce gas, the device having an exit of adjustable cross sectional area in fluid communication with the first chamber and wherethrough at least a portion of the produced gas can exit the device, the method comprising:

adjusting the cross sectional area of the exit in response to receipt of a control signal from an associated control assembly.

25. The method of claim 24 wherein the cross sectional area of the exit is reduced and the burn rate of the gas generant material is increased.

26. The method of claim 24 wherein, in response to receipt of a control signal from an associated control assembly, the cross sectional area of the exit is increased and the burn rate of the gas generant material is decreased.

27. The method of claim 24 wherein the device includes at least one first exit port and at least one second exit port with a cover element movable in response to the control signal from the control assembly to selectively cover the at least one second exit port and wherein, in response to receipt of a control signal from an associated control assembly, the cover element selectively covers the at least one second exit port.

28. The method of claim 27 wherein, in response to receipt of a control signal from an associated control assembly, the cover element is moved and covers the at least one second exit port.

29. The method of claim 27 wherein, in response to receipt of a control signal from an associated control assembly, the cover element is moved and uncovers the at least one second exit port.

* * * * *